United States Patent [19]

Stoner

[11] 3,857,170
[45] Dec. 31, 1974

[54] METHOD AND APPARATUS FOR POSITIONING COMPONENTS OF DYNAMOELECTRIC MACHINE FOR ASSEMBLY

[75] Inventor: Jesse A. Stoner, Dekalb, Ill.

[73] Assignee: General Electric Company, Fort Wayne, Ind.

[22] Filed: Sept. 14, 1973

[21] Appl. No.: 397,297

[52] U.S. Cl. .................... 29/596, 29/205 R, 29/598
[51] Int. Cl. .......................................... H02k 15/00
[58] Field of Search .......... 29/596, 598, 205 R, 467, 29/468, 271; 310/42, 90

[56] References Cited
UNITED STATES PATENTS

| | | | |
|---|---|---|---|
| 3,165,816 | 1/1965 | Thompson et al. | 29/596 |
| 3,268,986 | 8/1966 | Lacy | 29/596 |
| 3,359,628 | 12/1967 | Rutledge et al. | 29/596 |
| 3,419,957 | 1/1969 | Stone | 29/596 |
| 3,484,934 | 12/1969 | Wightman | 29/596 |
| 3,714,705 | 2/1973 | Lewis | 29/596 |
| 3,755,889 | 9/1973 | Busian | 29/596 |

*Primary Examiner*—Carl E. Hall
*Attorney, Agent, or Firm*—Joseph E. Papin

[57] ABSTRACT

A method of positioning components of a dynamoelectric machine for assembly and compensating for out-of-square stators. A rotatable assembly of the dynamoelectric machine is supported in at least one end frame thereof with the out-of-square stator disposed about the rotatable assembly, and the stator is moved substantially along the axis of the rotatable assembly to a position for assembly without skewing the stator with respect to the axis. Apparatus for positioning components of a dynamoelectric machine for assembly to compensate for an out-of-square stator is also disclosed along with a method and apparatus for introducing a predetermined amount of end-play into the dynamoelectric machine between the end plate and rotatable assembly thereof.

76 Claims, 10 Drawing Figures

3,857,170
FIG. 8A
FIG. 8B
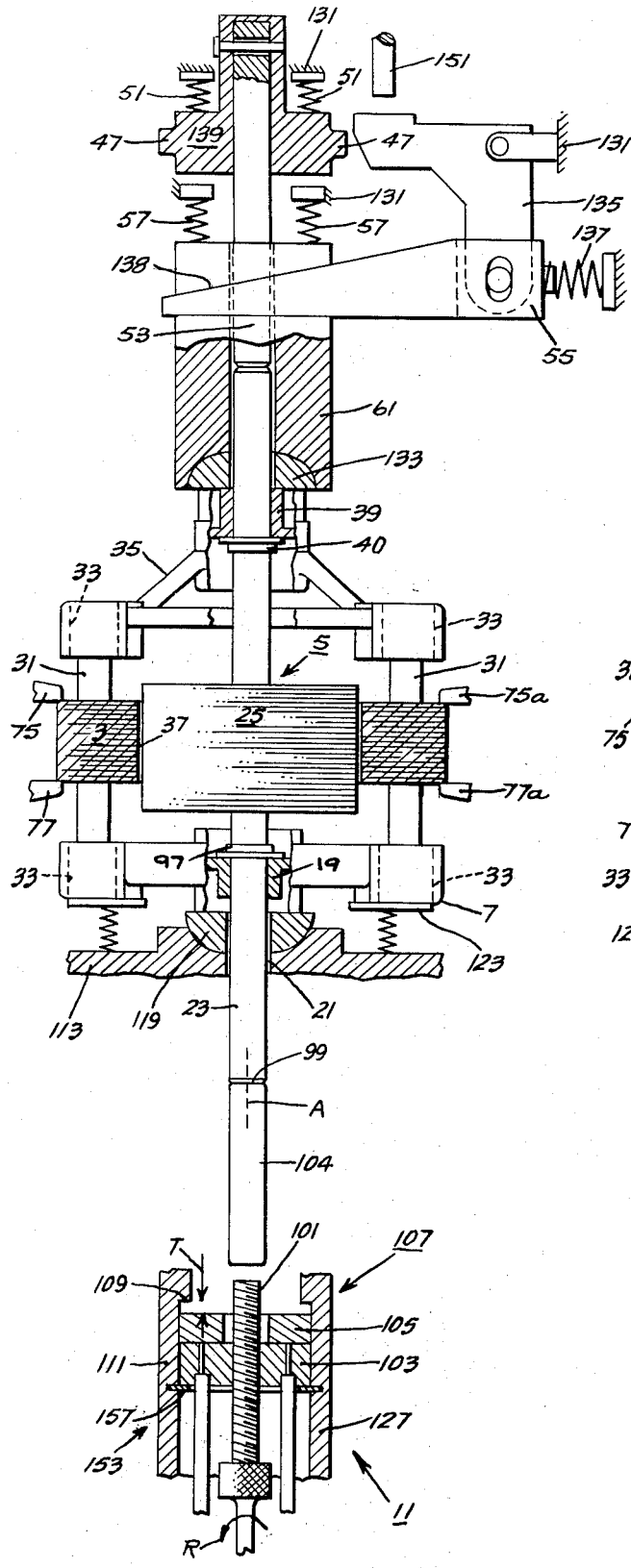
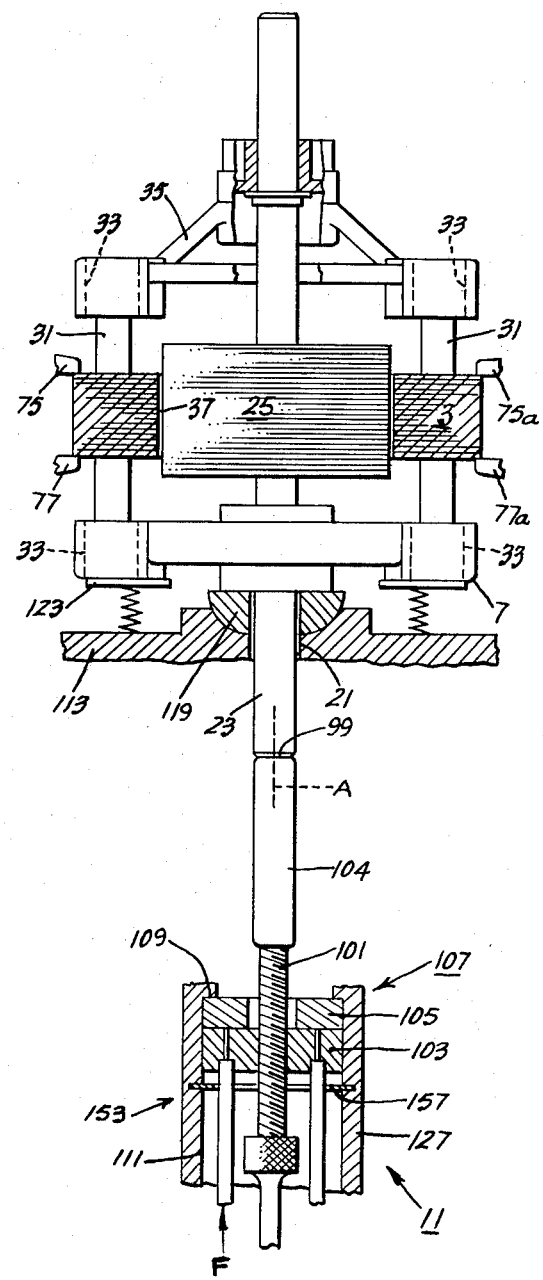

METHOD AND APPARATUS FOR POSITIONING COMPONENTS OF DYNAMOELECTRIC MACHINE FOR ASSEMBLY

FIELD OF THE INVENTION

This invention relates generally to dynamoelectric machines and in particular to methods and apparatus for positioning components thereof for assembly and also for introducing a predetermined amount of end-play between components of such dynamoelectric machines.

Dynamoelectric machines have a stationary member, commonly referred to as a stator, disposed about a rotatable assembly, which generally comprises a rotor and shaft, with the rotor and stator being spaced apart by an annular air gap and with the shaft journaled through bearings carried by end frames of the dynamoelectric machine. The rotor is rotated by establishing a magnetic flux field across the air gap, the strength and effectiveness of which is controlled to a large extent by the radial extent of the air gap. This gap must necessarily be quite small, but nevertheless, without any structural interference between the rotor and stator core. It is also desirable that the annular air gap be uniform throughout since off-center rotors tend to create the disadvantageous or undesirable features of vibration, excessive noise, and inefficient performance of the dynamoelectric machine. In addition, to the above-discussed radial alignment, the rotor must also be positioned relative to the stator with relative axial movement therebetween, commonly referred to as end-play, limited to a preselected magnitude. Positioning of the rotatable assembly and stator radially and axially of each other, as discussed above, must be accomplished in conjunction with proper alignment of the rotor shaft in bearings therefor carried by the opposite end frames of the dynamoelectric machine.

Heretofore, solutions or approaches to the above described problems of positioning dynamoelectric machine stators and rotors relative to each other for mass production assembly have been evolved in various manners. One solution has been provided by holding a large number of dimensions within very close limits. This solution, however, has a disadvantageous or undesirable feature of requiring close tolerances between machined parts which, being cumulative, places a practical limitation on the minimum radial width of the air gap since such must be sufficient to allow for dimensional variations of rotors and stators within manufacturing allowances. Obviously, this solution has also proven to be quite costly.

Another solution has been the use of simulated or dummy rotors. In the case of unit bearing machines, that is machines in which the rotor shaft is supported only at one end, a stator core is placed over a dummy rotor having an outside diameter slightly larger than the actual rotor with the dummy rotor shaft journaled in the end frame bearing and positioned to simulate their final assembly positions. The end frames, which carry the bearings, are then attached by suitable means, such as through-bolts or welding for instance, to the stator, and the actual rotor and shaft are thereafter substituted for the dummies. This solution also has disadvantageous or undesirable features since tightening of the through-bolts or making the welds after alignment may introduce stresses which tend to create misalignments inofthemselves. In machines having a rotor shaft supported at both ends, it is necessary to provide detachable end frames in order that the actual rotor may be substituted for the dummy; however, the use of detachable end frames not only requires the disadvantageous or undesirable feature of double insertion of rotors but also double assembly of one of the end frames, the second assembly of which is frequently not of the same alignment as the first.

In U.S. Pat. No. 3,165,816 issued to P. W. Thompson, et al. which patent is assigned to the assignee of the instant application, there is disclosed a new approach in aligning components of dynamoelectric machines for assembly. Here, the stator and rotor assemblies are coaxially aligned in spaced relation with removable shims inserted therebetween during assembly of the dynamoelectric machine. The rotor shaft supported end frames are loosely assembled adjacent the stator core with the rotor shaft journaled through bearings carried by the end frames and with a portion of the end frames and stator overlapping one another. A structural adhesive material having no substantial shrinkage is placed in its unhardened state between the overlapping surfaces of the end frames and stator, and the adhesive permits unstressed relative movement between the overlapping surfaces as the shaft aligns with the bearings in the end frames. The adhesive is then allowed to harden thereby bonding the end frames and stator core together, and the shims removed. It may be noted that once the stator is disposed about the rotor, there is no movement of the stator to a subsequent position for assembly.

The apparatus disclosed by the Thompson et al. patent for performing the positioning for assembly process includes a support plate having a shaft receiving recess in which a screw is threaded. This recess establishes the position of the rotor axis. With an end frame supported on the plate and a rotor shaft journaled through the end frame bearing and guidably positioned in the shaft receiving recess, the screw can be rotated upwardly into contact with the lower end of the shaft. The screw may then be rotated further upwardly thereby raising the rotor and shaft, as well as an upper end frame supported thereon, away from the lower end frame on the apparatus support plate. In this manner rotor end play is introduced between the end frames and the rotor. The apparatus also includes a pair of apertures through which two arms extend with the upper ends thereof supporting the stator. The lower ends of the arms are mounted to a bar which is pivotably mounted to the apparatus by a pin disposed transversly of the shaft axis. In this manner, out-of-square variations between successive stators are absorbed by the assembly apparatus. While this patent undoubtedly discloses at least some advantageous features, one of the disadvantageous or undesirable features thereof is that the operation thereof is substantially manual not lending itself particularly well to production line methods. In other words, when the stator is disposed about the rotor, it is generally in a position for assembly, and there is no apparatus for moving the stator relative to the rotor to automatically locate the stators position for assembly. U.S. Pat No. 3,195,222, which patent is likewise assigned to the assignee of the present application, has also undoubtedly provided additional advantageous features for advancing the art, particularly with regard to alignment of the end frame bearings with the rotor shaft by bonding the end frames to the stator core with the rotor shaft journaled through the bearings and with the shaft and end frames supported at an angle less than 90° relative to the horizontal. The actual angle selected in such that the center of gravity of each end frame is carried by the shaft in a vertical plane which projects through journaled surfaces of the shaft thereby preventing the creation of force moments which would tend to cock the bearing with respect to the shaft.

As previously mentioned, in the Thompson et al. process, end-play is introduced by rotating a screw against the lower end of a vertically supported rotor shaft and raising it, along with an upper end frame supported thereon, while leaving the lower end frame stationary. In mass producing dynamoelectric machines, the lengths of rotor shafts extending beneath the portion of the rotor supported on the apparatus varies to some degree from rotor to rotor, and another disadvantageous or undesirable feature of this patent was that these dimensional variations were passed directly along as variations in rotor end-play since the screw employed by Thompson et al did not sense the point at which contact is actually made with the lower end of the rotor shaft. The Thompson process rather assumes uniformity of axial shaft dimensions between successive rotors during mass production.

SUMMARY OF THE INVENTION

A principle object of the present invention is to provide a method and apparatus for positioning components of a dynamoelectric machine for assembly and compensating for out-of-square stators thereof and for introducing end play between rotatable assemblies and end frames of dynamoelectric machines which overcome the aforementioned undesirable and disadvantageous features of such past methods and apparatus, and this, as well as other objects and advantageous features of the present invention, will in part become apparent and in part be pointed out by the drawings and description of the present invention which follows.

In general, a method in one form of the invention positions components of a dynamoelectric machine for assembly and compensates for an out-of-square stator. A rotatable assembly of the dynamoelectric machine is supported in at least one end frame thereof, and the stator is disposed about the rotatable assembly. A pair of means for clamping the stator are displaced into engagement with a high portion and a low portion on an end of the stator. The stator and the clamping means are then moved conjointly generally along the axis of the rotatable assembly to a position for assembly without skewing the stator with respect to the axis.

Also in general, a method in one form of the invention involves predetermining end-play of a rotatable assembly in a dynamoelectric machine by supporting an end frame which serves generally as a reference for locating an end portion of the rotatable assembly disposed therein. The position of a free end extending from the rotatable assembly end portion is then sensed, and the rotatable assembly is moved a predetermined distance from the sensed position of its free end relative to the end plate for predetermining the amount of end-play between the rotatable assembly end portion and the end frame.

In general, apparatus in one form of the invention for providing a predetermined amount of end play between components of a dynamoelectric machine generally comprises means for sensing the position of an end portion of a rotatable assembly mounted in an end frame of the dynamoelectric machine, and means for conjointly actuating the sensing means and the rotatable assembly relative to the end frame from the sensed position to another position defining the predetermined amount of rotatable assembly end-play in the dynamoelectric machine.

Further, and in general, other apparatus in one form of the invention for positioning components of a dynamoelectric machine for assembly to compensate for an out-of-square stator comprises means for supporting a rotatable assembly of the dynamoelectric machine in at least one end frame thereof, and a pair of means for respective engagement with a low portion and a high portion of an end of the stator and operable generally for moving the stator relative to the one end frame and the rotatable assembly generally coaxially with the axis thereof toward an assembly position of the stator without skewing it with respect to the rotatable assembly axis.

BRIEF DESCRIPTION OF THE DRAWING

FIGS. 8A and 8B are schematic views of apparatus of the present invention included in the apparatus of FIGS. 1–7, which may also be used in practicing principles and methods of the present invention.

Corresponding reference characters indicate corresponding parts throughout the several views of the drawings.

Figure 1:
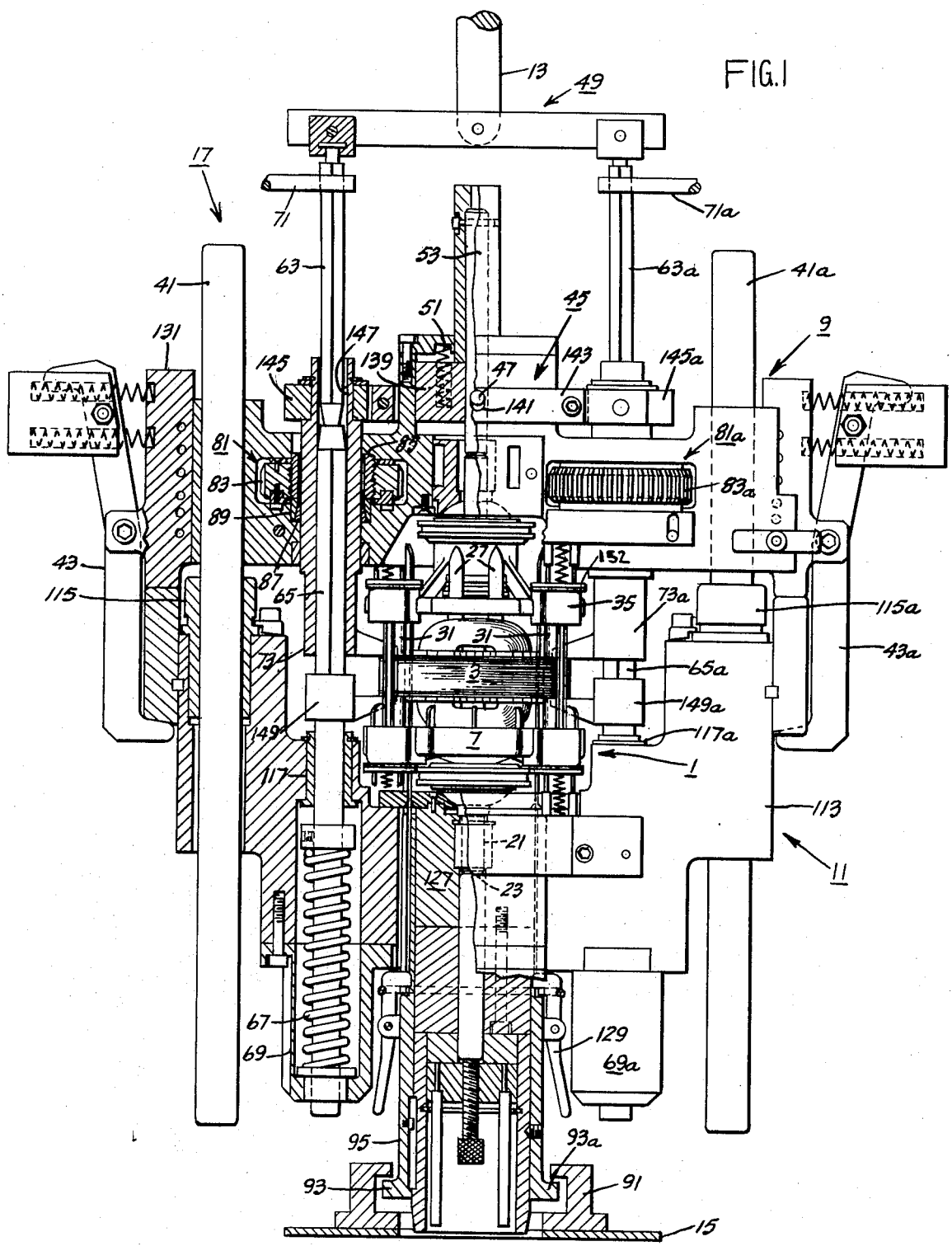
FIG. 1 is a partial sectional view of apparatus of this invention for aligning components of a dynamoelectric machine for assembly with some components thereof shown schematically which may be used in practicing principles and methods of the present invention.

The following examples respectively illustrate the invention in one form thereof and are not to be construed as limiting in any manner.

DETAILED DESCRIPTION OF THE DRAWINGS

Referring now to the drawings in general, a method of positioning components of a dynamoelectric machine 1 (FIGS. 1 and 7) for assembly and compensating for an out-of-square stator 3 is shown by supporting a rotatable assembly 5 of the dynamoelectric machine in at least one end frame 7 thereof and having the stator disposed about the rotatable assembly, and the stator is thereafter moved generally, along an axis A of the rotatable assembly to a position for assembly without skewing the stator with respect to the axis A.

More particularly and with reference also to FIG. 1, the one or lower end frame 7 is initially placed in a predetermined position on the lower one of upper and lower assembly fixtures 9, 11, which along with upper and lower slides or mechanism indicated generally at 13, 15 of a machine (not shown) for actuating the fixtures, constitute apparatus 17 for positioning components of dynamoelectric machine for assembly to compensate for out-of-square stator 3. With lower end frame 7 disposed on lower fixture 11 (FIG. 8A), bearing means 19 of the lower end frame is disposed over a locating or referencing means, such as a locating aperture or shaft receiving hole 21 in the lower fixture, and a shaft 23, which carries a rotor 25 thereby to constitute rotatable assembly 5, has its lower end portion inserted through the bearing means for journaling engagement therewith and into locating engagement with the locating aperture. In this manner, rotatable assembly 5 is positively located relative to lower end plate 7 thereby to predeterminately position or locate axis A of the rotatable assembly in a substantially perpendicular position.

Figure 1A:
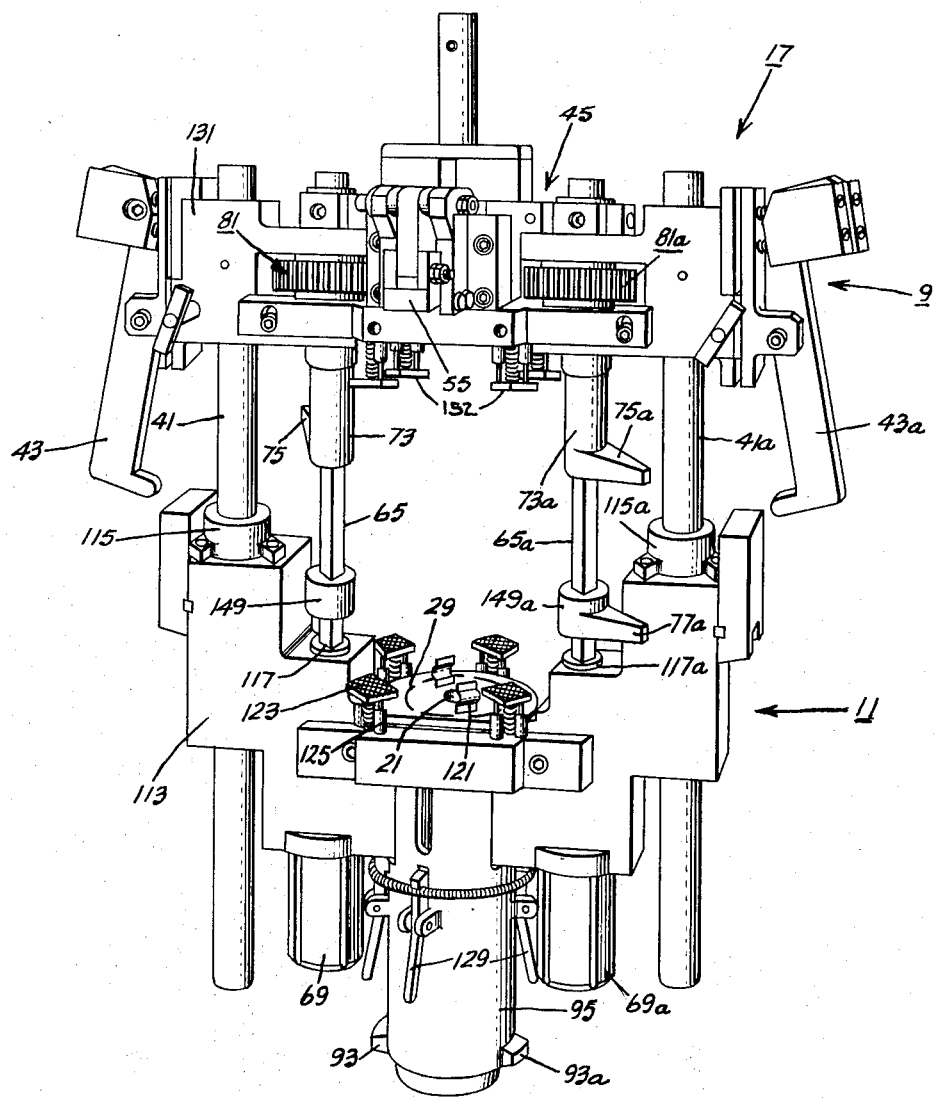
FIG. 1A is a perspective view of FIG. 1.
Figure 2:
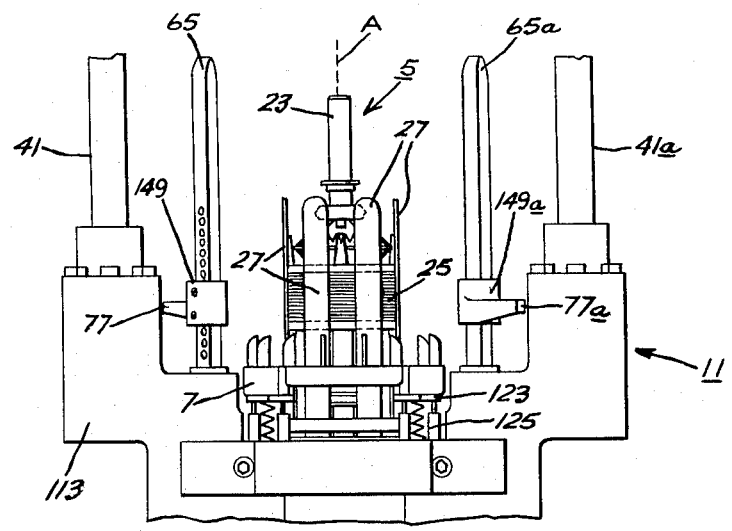
FIGS. 2–4 are each front elevational views of a lower portion of the apparatus shown in FIG. 1 with a portion of a dynamoelectric machine shown mounted thereon in a succession of assembly steps which are embodied in the present invention.

Referring now also to FIG. 2, rotatable assembly 5 and lower end frame 7 are shown disposed in this predetermined position on lower fixture 11, and at this time, shim means, such as a plurality of shims 27, are protractively moved upwardly through a plurality of circularly disposed slots 29 provided therefor in lower fixture 11, as shown in FIG. 1A, and through apertures (not shown) in lower end frame 7 to shimming positions disposed about the periphery of rotor 25.

Figure 3:
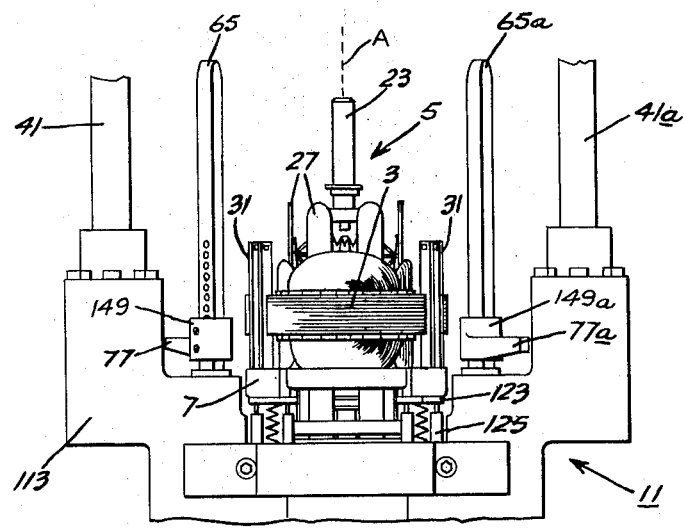
Figure 4:
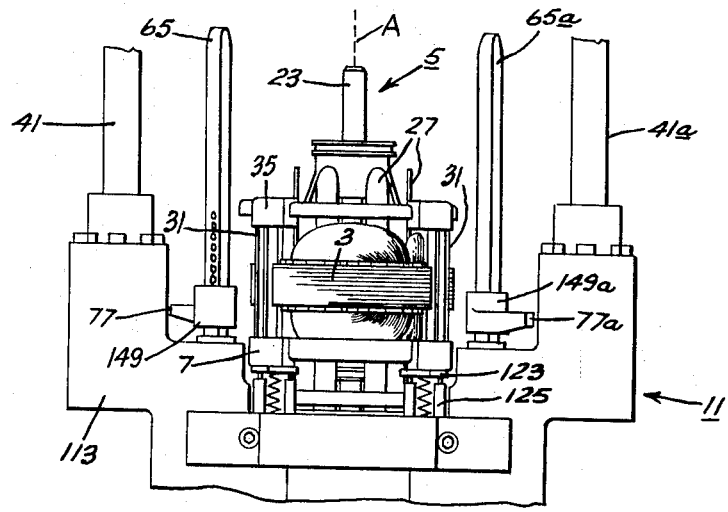

Stator 3, as also shown in FIGS. 3 and 8A carries a plurality of mounting beams 31 having end portions thereof for mounting engagement within cooperating sockets 33 provided therefor in lower end frame 7 and an opposite upper end frame 35 which is received on the upper end of shaft 23, as discussed hereinafter. A bore 37 of stator 3 is manually positioned or placed about the periphery of rotor 25 by an operator with the lower end portions of beam 31 disposed within sockets 33, and in this manner, shims 27 are interposed in shimming engagement between the rotor periphery and the stator bore to predetermine the air gap therebetween upon the assembly of the dynamoelectric machine components together in their final assembly positions (not shown). As shown in FIGS. 4 and 8A, a bearing means 39 which is provided in upper end frame 35 is placed over the upper or opposite end portion of shaft 23 for journaling engagement therewith with sockets 33 of upper end frame 35 received about the upper end portion of stator beams 31. Bearing 39 is disposed in engagement with a thrust washer 40 or the like which is fixedly positioned on the upper end portion of the shaft 23.

Figure 5:
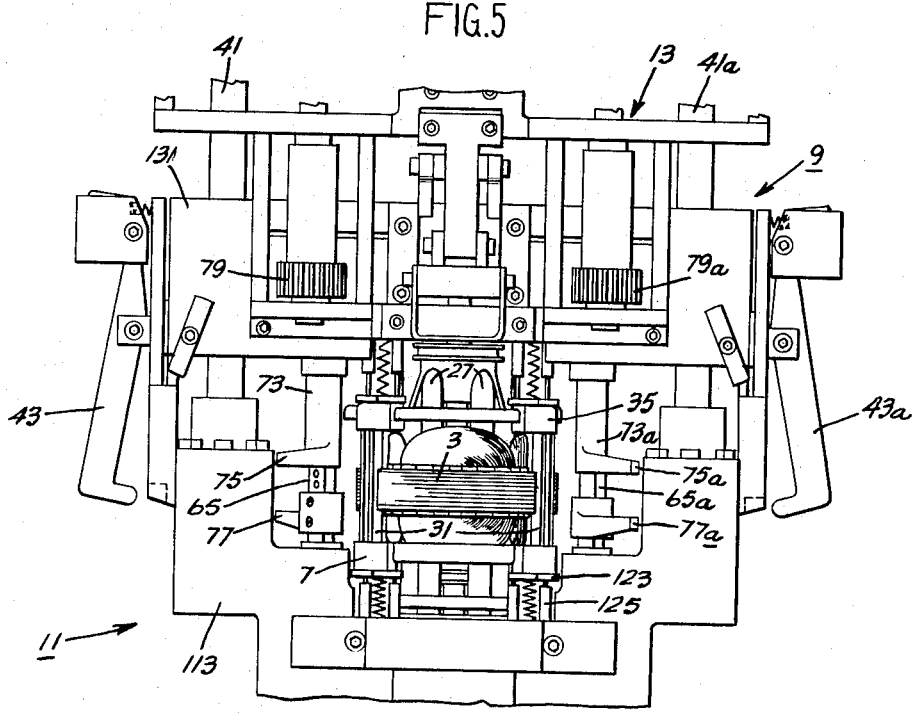
FIGS. 5 and 6 are each front elevational views of both the lower and upper portions of the apparatus shown in FIG. 1 in successive positions of aligning an electric motor in assembly steps following those shown in FIGS. 2–4 which are also embodied in the present invention.

Upper fixture 9 carries guide shafts or rods 41, 41a which are suitably journaled in lower fixture 11, and actuation of upper slide 13 by suitable means (not shown), moves the upper fixture downwardly into abutment with the lower fixture. A pair of fixture locking means or levers 43, 43a, which are pivotally and resiliently mounted on upper fixture 9, are swung or resiliently urged inwardly into locking engagement with a mating part of lower fixture 11 thereby to secure the upper and lower fixtures together against displacement in the closed position thereof, as shown in FIGS. 1 and 5.

Figure 7:
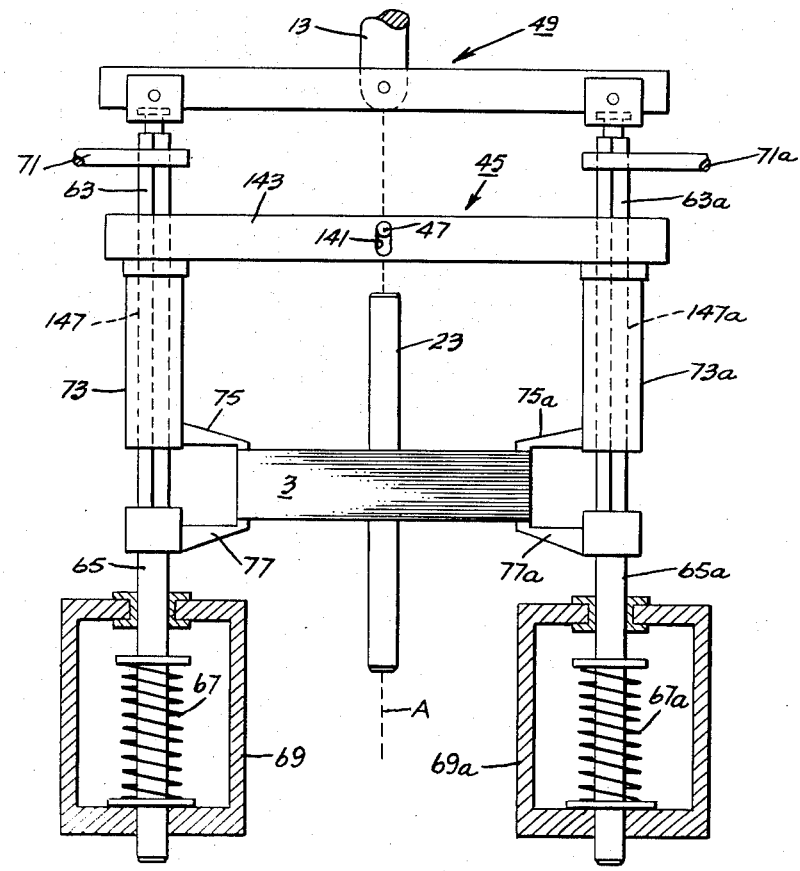
FIG. 7 is a schematic view of a portion of the apparatus shown in FIGS. 1–6 illustrating the movement of the stator of the dyamoelectric machine to generally its assembled position.

Referring now to FIGS. 1, 7 and 8A, when upper and lower fixtures 9, 11 are so locked together, a rocker arm mechanism, indicated generally at 45, which is provided in the upper fixture 9, is movable therewith to a position pivotal about its trunnions 47, and another rocker arm mechanism, indicated generally at 49, which forms a portion of upper slide 13, is in is pivotal position when the upper slide drives the upper fixture to its position in locking engagement with the lower fixture. When fixture rocker arm 45 is in its pivotal position, the compressive forces of a plurality of springs 51 urge a plunger or shaft extension 53 carried by the fixture rocker arm into biasing engagement with the upper end of shaft 23 urging it and lower end plate 7 downwardly thereby to engage the lower end plate with lower fixture 11. Further, during movement of slide rocker arm 49 to its pivotal position, upper slide 13 acutates a slide or wedge device 55 carried in upper fixture 9 thereby to effect the release of a plurality of springs 57 therein for urging a wedge block 61 downwardly into biasing engagement with upper end frame 35 to bias it into engagement with rotatable assembly 5. In this manner, when both fixture and slide rocker arms 47, 49 are in their pivotal positions, rotatable assembly 5 and end frames 7, 35 are resiliently urged together or locked in predetermined positions by the compressive forces of springs 51, 57, as further discussed hereinafter.

During movement of slide rocker arm 49 to its pivotal position, a pair of generally square, laterally spaced arms or rods 63, 63a thereof abut and conjointly drive another pair of generally square, laterally spaced rods 65, 65a downwardly against the compressive forces of a pair of springs 67, 67a biased between the lower ends of rods 65, 65a and a wall of spring chambers 69, 69a provided in lower fixture 11. Rotating levers 71, 71a are actuated by suitable means (not shown) to controllably effect rotation of rods 63, 63a thereby to drivingly rotate a pair of sleeves 73, 73a which are pivotally mounted on fixture rocker arm 45 and slidably mounted in upper fixture 9, and in turn, sleeves 73, 73a rotatably drive rods 65, 65a. In this manner, a pair of stopping means, such as upper fingers or stops 75, 75a, and a pair of clamping or engagement means, such as lower fingers or clamps 77, 77a, which are fixedly secured to sleeve 73, 73a and rods 65, 65a, respectively, are rotated inwardly into juxtaposition with the upper and lower end or end faces of stator 3.

At this time, upper slide 13 is retracted slightly upwardly thereby permitting the compressive forces of springs 67, 67a to conjointly move fixture rods 65, 65a upwardly in following engagement with slide rods 63, 63a to drivingly engage clamps 77, 77a with the lower end of stator 3. Since stator 3 is out-of-square, as previously mentioned, both the upper and lower ends thereof have high and low portions or surfaces thereon; therefore, one of clamps 77, 77a engages the stator lower end high portion prior to the engagement of the other of clamps 77, 77a with the stator lower end low portion. Assuming arguendo that clamp 77 engages the stator lower end high portion, further movement of the clamp is resisted, and clamp 77a is then movable relative thereto in response to the compressive force of spring 67a into engagement with the stator lower end low portion. Such relative movement of clamp 77a conjointly drives rods 65a and 63a upwardly to pivot slide rocker arm 49, and in this manner, pivoting of the slide rocker arm allows clamp 77a to move upwardly relative to clamp 77.

When clamps 77, 77a each are engaged with the lower end of stator 3, as above described, springs 67, 67a are again effective to cause further conjoint upward movement of the clamps thereby to conjointly drive stator 3 upwardly on shims 27 moving stator bore 37 coaxially along axis A of rotatable assembly 5 of engaging the upper end of the stator with stops 75, 75a. Since stator 3 is out-of-square, one of stops 75, 75a will be engaged by the stator upper end high portion prior to the engagement of the other of stops 75, 75a with the stator upper end low portion. Assuming arguendo that stator upper end high portion first engages stops 75, it is then movable upwardly in response to the compressive force of springs 67, 67a acting on stator 3 relative to stop 75a which, in turn, causes slide rocker arm 49 to pivot thereby moving stop 75a downwardly to effect engagement with the stator upper end low portion. With stops 75, 75a so pivoted by slide rocker arm 49 into respective engagement with the high and low portions on the upper end of stator 3, further conjoint movement of clamps 77, 77a and the stator is arrested, and the relative positions of the stops define the setting or assembly position of the stator with respect to rotatable assembly 5 and end frames 7, 35. It may be noted that stator 3 has been moved by clamp 77, 77a generally coaxially of rotatable assembly 5 along axis A thereof to the assembly position of the stator without canting or skewing the stator with respect to axis A of the rotatable assembly.

Figure 6:
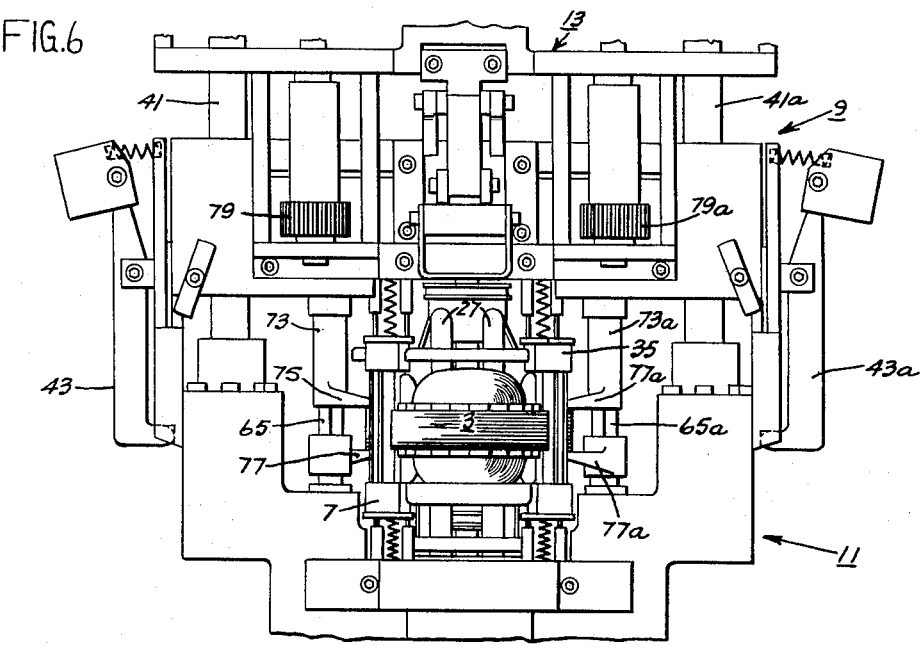

With stator 3 in its assembly position, a pair of driving gears 79, 79a provided on upper slide 13, as shown in FIG. 6, are drivingly engaged with means, such as locking devices 81, 81a shown in FIGS. 1 and 1A, for locking the stator in its assembly position. For the sake of simplicity, only locking device 81 is shown in cross-section, but the corresponding parts of locking device 81a is described hereinafter and designated by the letter a. Locking devices 81, 81a generally comprise a pair of gears 83, 83a rotatably supported in upper fixture 9 and driven by slide gears 79, 79a upon actuation thereof by suitable means (not shown). When driven gears 83, 83a are so rotated, they drive annular threaded screw devices 85, 85a operatively associated therewith for actuating male and female or annular wedge members 87, 89 and 87a, 89a between releasing positions and tightened or locking positions engaged between lower fixture 11 and the peripheries of sleeves 73, 73a. In this manner, slide gears 79, 79a are drivingly meshed with locking gears 83, 83a which drive screw devices 85, 85a downwardly wedging male and female wedges 87, 89 and 87a, 89a into locking engagement between upper fixture 9 and sleeves 73, 73a thereby to obviate further pivotal or rotational movement of the sleeves and lock stator 3 in its assembly position.

Having locked stator 3 in its assembly position against further movement in response to the compressive forces of springs 67, 67a, upper slide 13 is now retracted by suitable means (not shown) upwardly to its original or at-rest position disengaging rods 63, 63a or rocker arm device 49 from upper fixture 11 and at the same time permitting wedge 55 (FIG. 8A) to return to its original position in engagement with wedge block 61. Lower slide 15 is initially rotated to a position disengaging bayonet means 91 thereof from cooperating abutment means, such as opposite flanges 93, 93a on a generally cylindric shim actuating member 95, and then moved downwardly relative thereto to the at-rest position of the lower slide by suitable actuating means (not shown). When lower slide 15 is in its original position, fixture 9, 11 may be selectively moved to another work station for inserting of a predetermined amount of end-play between rotatable assembly 5 and upper and lower end frames 7, 35; however, for the sake of simplicity, the method of introducing end play into dynamoelectric machine 1 is described hereinafter in the same work station.

Referring now to FIGS. 8A and 8B, in general, a method of predetermined end play of rotatable assembly 5 is dynamoelectric machine 1 involves supporting lower end frame 7 which serves generally as a reference for locating an end portion, such as a thrust washer 97 or the like secured to the lower end portion of shaft 23, of the rotatable assembly disposed in the lower end frame. The position of a free end 99 of shaft 23 is sensed, and rotatable assembly 5 is then moved a predetermined distance T from the sensed position of its free end relative to lower end frame 7 for predetermining the amount of end-play between rotatable assembly 5 and lower end frame 7.

More particularly, sensing or locating means, such as a screw 101, is rotated by means of a torque limiting device, such as an over-running or slip clutch mechanism or the like (not shown) but represented by the rotational arrow R in FIG. 8A connected therewith, or if desired, such torque limiting device may be incorporated into the screw. Rotation of screw 101 effects threaded movement thereof through and relative to a nut 103 until the screw abuttingly engages the free end 99 of shaft 23 or a scraper 104 engaged therewith, if desired, thereby to sense or locate the position of the shaft free end, and upon such abutting engagement, the compressive force of springs 51 acting downwardly on shaft 23, as previously mentioned, resists or opposes further upward rotational movement of the screw thereby to cause the torque limiting device to slip or run free in a manner well known in the art. Upon determining the sensed position of shaft lower or free end 99, other actuating means, such as a cylinder or the like (not shown), applies force F onto nut 103 jointly driving it, a spacer 105 carried thereby, and screw 101, which constitute shaft end sensing assembly 107, upwardly through a predetermined distance or travel T between the spacer and movement limiting means, such as an abutment 109, disposed about a bore 111 in lower fixture 11 in which the shaft end sensing assembly is movable. In this manner, the upward movement of shaft end sensing assembly 107 through travel T conjointly drives rotatable assembly 5 relative to lower end plate 7 from the sensed position of the lower end 97 of shaft 23 to a displaced position thereby introducing or inserting a predetermined amount of end-play, which is substantially equal to travel T, into dynamoelectric machine 1 between rotatable assembly 5 and lower end frame 7, and upper end frame 35 is conjointly movable upwardly with rotatable assembly 5 upon the introduction of the end-play, as above described.

In general, and as shown in FIGS. 1 and 1A, apparatus 17 for positioning components of dynamoelectric machine 1 for assembly to compensate for out-of-square stator 3 is provided with means, such as upper and lower fixtures 9, 11, for supporting rotatable assembly 5 of the dynamoelectric machine in at least one end frame, such as lower end frame 7 thereof, and means, such as rocker arms 47, 49, for moving the stator relative to the lower end frame and rotatable assembly generally coaxially with axis A thereof toward the assembly positions of the stator without skewing it with respect to the rotatable assembly axis.

More particularly, upper and lower slides 13, 15 are components of an automatically operable motor assemblying machine (not shown), and the upper and lower slides function to actuate upper and lower fixtures 9, 11 at a work station of the assemblying machine. Lower fixture 11 is provided with a frame 113 having pairs of opposite guide or bearing means 115, 115a and 117, 117a in which guide pins 41, 41a and fixture rods 65, 65a are received for generally linear vertical movement, and spring chambers 67, 67a are suitable attached to the lower end of the frame, as shown in FIGS. 1 and 1A. Locating aperture 21 is centrally disposed in fixture frame 113 having shim slots 29 spaced thereabout, and a pivotal mounting cap 119, as also shown in FIG. 8A, is pivotally disposed on the fixture frame about the locating aperture for positioning engagement with lower end frame 7. Between locating aperture 21 and shim slots 29, there is mounted end frame positioning means, such as a pair of clips 121, which may be cammed into gripping positioning engagement lower end frame 7 when it is positioned on the fixture frame. A plurality of spring loaded, heat resistant pads 123 of asbestos or the like are disposed about slots 29, and these pads are depressable by lower end frame 7 placed thereon toward engagement with abutments or stops 125 provided therefor on fixture frame 113. A guide cylinder 127 is centrally attached by suitable means to the lower end portion of fixture frame 113, and cylindric member 95 is reciprocally movable thereon for protractively and retractively moving shims 27 through their slots 29. Quick disconnect means, such as a plurality of latches 129, are pivotally mounted on cylindric member 95 for positioning engagement with shims 27 and facilitating quick-release thereof whenever it is necessary to change shims.

Upper fixture 9 is provided with a frame 131 in which guide pins 41, 41a are fixedly received, and locking arms 43, 43a are pivotally mounted on opposite ends of the fixture frame. As also schematically shown in FIG. 8A, wedge block 61 is reciprocably mounted centrally of fixture frame 131, and a pivotal mounting cap 133, through which the upper end portion of dynamoelectric machine shaft 23 extends, is pivotally disposed in the lower end of the wedge block for pivoted positioning engagement with dynamoelectric machine upper end frame 35. Springs 57 are engaged between a portion of fixture frame 131 and wedge block 61 urging it downwardly toward engagement with dynamoelectric machine upper end frame 35, and wedge 55 is slidably received in the fixture frame for engagement with a cooperating surface 133 on wedge block 61. A bell crank 135 is also pivotally mounted on fixture member 131 for actuation by upper slide 13, as discussed hereinafter, and spring means 137 urges the bell crank toward resilient driving engagement with wedge 55 for selectively engaging it with wedge block surface 138 to contain the compressive forces of springs 57.

Fixture rocker arm 45 is provided with a trunnion block 139 which is vertically reciprocably movable in fixture frame 131, and shaft extension 53 is connected to the trunnion block and conjointly movement therewith for abutting engagement with the upper end of the dynamoelectric machine shaft 23. Springs 51 are engaged between a portion of fixture frame 131 and trunnion block 139 for urging shaft extension 53 toward engagement with the upper end of shaft 23, and opposite trunnions 47 provided on the trunnion block extend laterally through opposite elongate pivot slots 141 in a pivotal or rockable yoke or arm member 143. A pair of pivotal connecting members 145, 145a are pivotally connected to yoke 143 adjacent its opposite ends, and the upper ends of sleeves 73, 73a extend through the connecting members in fixed engagement therewith. Sleeves 73, 73a are journaled in fixture frame 131 for generally vertical reciprocal movement, and generally square bores 147, 147a extend through the sleeves for receiving fixture rods 65, 65a and slide rods 63, 63a which have a cross-sectional configuration generally complementary to that of the sleeve bores wherein the sleeves may also be drivingly rotated in the fixture frame and connecting members 145, 145a. Driven gears 83, 83a are rotatably mounted in fixture frame 131 for driving worm gears 85, 85a which are disposed about the periphery of sleeves 73, 73a and drive male and female wedges 87, 89 and 87a, 89a for locking engagement between a portion of the fixture frame and the periphery of the sleeves.

Clamping means 77, 77a are integrally formed with mounting collars 149, 149a therefor which are fixedly positioned on fixture rods 65, 65a by suitable means (not shown), and when upper slide 13 is in its raised or at-rest position disassociating its rods 63, 63a from fixture rods 65, 65a, springs 67, 67a urge the mounting collars upwardly into engagement with the lower ends of sleeves 73, 73a thereby to move the sleeves and yoke 143 upwardly. This upward movement of yoke 143 engages the bottom portion of elongate slots 141 with trunnions 47 of trunnion block 139 to effect conjoint movement thereof upwardly toward a raised, at rest or non-pivoting position for caging the forces of springs 51. A push pin 151 is provided on upper slide 13 for engagement with bell crank 135, and when upper slide is in its raised position disassociating the plunger from the bell crank, bell crank spring 137 urges wedge 55 toward engagement with wedge block surface 138 to contain the forces of springs 57. To complete the description of apparatus 17, other spring loaded, heat resistant pads 152 of asbestos or the like are carried on fixture frame 131 for engagement with upper end frame 35 about sockets 33 therein, as shown in FIG. 1.

In general, apparatus 153, as shown in FIGS. 1, 8A and 8B, for providing a predetermined amount of end-play between components of dynamoelectric machine 1 is provided with means, such as shaft end sensing assembly 107, for sensing the position of an end portion of rotatable assembly 5 mounted in end frame 7, and means, such as an air cylinder or other actuation of a type well known in the art as indicated by the force arrow F in FIG. 8B, for conjointly actuating the sensing means and the rotatable assembly relative to the end frame from the sensed position to another position defining the predetermined amount of rotatable assembly end-play in the dynamoelectric machine.

As previously mentioned screw 101, nut 103 and spacer 105 generally constitute shaft end sensing assembly 107, and the screw is driven by a torque limiting device, such as an over-running or slip clutch mechanism or the like (not shown) but represented by the rotational arrow R in FIG. 8A; however, if desired, such torque limiting device may be incorporated into the head of the screw, as well known in the art. Shaft end sensing assembly 107 is movably mounted in bore 111 provided in the lower end of cylinder 127 attached to frame 113 of lower fixture 11, and opposed or predeterminately spaced apart abutments or seats 109, 157 are provided on the cylinder about the bore thereof for abutment or movement limiting engagement with nut 103 and spacer 105 respectively. Nut 103, in which screw 101 is threadedly received for engaging the lower end of shaft extension to sense the position thereof relative to end frame 7, is normally positioned in seating or abutting engagement with lower abutment 157, and the predetermined amount of end-play for introduction into dynamoelectric machine 1 is defined by travel T between spacer 105 and upper abutment 109.

In the operation of apparatus 17 with rotatable assembly 5 and lower end frame 7 of dynamoelectric machine 1 assembled on lower fixture 11, as previously described, at the loading work station of the automatic motor assembly machine (not shown), bayonet member 91 of lower slide 15 is initially rotated into position for engagement with flange 93 of cylindric member 95, and lower slide 15 is then actuated upwardly driving the cylindric member and shims 27 connected therewith upwardly to the protracted position of the shims extending through their slots 29 in lower fixture 11 and being disposed about the periphery of the rotatable assembly. The operator then loads stator 3 and upper end frame 35, as previously described, and upper slide 13 is lowered from its original at-rest or raised position by actuating means therefor (not shown) to its lowered or pivoting position conjointly driving upper fixture 9 downwardly therewith on guide pins 41, 41a journaled in bearing means 115, 115a toward engagement with lower fixture 9 wherein locking arms 43, 43a are pivoted into locking engagement with mating portions on the lower fixture thereby to lock the upper and lower fixtures together.

Upon the lowering of upper slide 13, rods 63, 63a thereof engage fixture rods 65, 65a driving them downwardly against the compressive forces of springs 67, 67a and disengaging clamp collars 149, 149a from abutment with sleeves 73, 73a. Springs 51 urge trunnion block 139 downwardly engaging its plunger 53 with the upper end of shaft 23, and in this manner, opposite trunnions 47 on the trunnions block are now disposed in a set stationary or pivoting position thereby to pivotally engage with elongate slots 141 in yoke 143 which defines the pivoting position or rocker arm 45. At the same time, driving gears 79, 79a are moved downwardly with upper slide 13 into mesh with driven gears 83, 83a, and upper slide push pin 151 engages and pivots bell crank 135 against its spring 137 thereby to move wedge 55 to a position disengaged from its cooperating surface 138 on wedge block 61 and release the compressive force of springs 57 urging the wedge block downwardly into position engagement with upper end plate 5. In this manner, rotatable assembly 5 and upper end frame 35 are clamped or maintained in their respective assembled position with axis A of the rotatable assembly generally perpendicular due to the locating engagement of shaft 23 in locating aperture 21 of lower fixture 9 and with bearing means 39 of the upper end frame journaled on the upper end of the shaft.

With both rocker arms 45, 49 now in their pivoting positions, levers 71, 71a are actuated by air cylinders or other suitable actuating means (not shown), as well known in the art, to controllably rotate slide rods 63, 63a, and due to the complementary configurations of the slide rods, sleeve bores 147, 147a and fixture rods 65, 65a, such rotation of the slide rods effects conjoint rotation of sleeves 73, 73a and the fixture rods thereby to pivot stops 75, 75a and clamps 77, 77a inwardly toward position juxtaposed with the upper and lower ends of stator 3, respectively. At this time, upper slide 13 is automatically raised a slight distance thereby to permit the compressive force of springs 67, 67a to urge fixture rods 65, 65a upwardly for engaging clamps 77, 77a with the lower end of stator 3, and in the pivoting position of rocker arm 45, its trunnions 47 are located in pivoting engagement with the upper end of elongate slots 141 of yoke 143, as shown in FIGS. 1 and 7. As previously mentioned, clamp 77 is assumed to initially engage the stator lower end high portion, and upon such engagement, the various frictions between associated components as well as the inertia of the stator counteracts or contains the compressive force of spring 67 thereby to obviate further upward movement of fixture rod 65 and clamp 77. However, at the same time, the compressive force of spring 67a continues to move fixture rod 65a and clamp 77a upwardly relative to the engaged clamp 77 until clamp 77a engages the stator lower end low portion. At this time, the compressive force of spring 67a is additive to that of spring 67 since both now act on stator 3 through the engagement therewith of clamps 77, 77a, and the additive force of springs 67, 67a are great enough to effect upward movement of stator bore 37 on shims 27 substantially coaxially with axis A of rotatable assembly 5. Upon the upward movement of clamps 77, 77a into engagement the stator 3 and the subsequent conjoint upward movement thereof, it may be noted that fixture rod 65a follows slide rod 63a thereby to effect pivotal movement of pivot arm 49 for permitting slide rod 63 to follow with fixture rod 65, and in this manner, the pivoting actuation of rocker arm 49 compensates for the out-of-square low and high portions on the lower end of stator 3 which, of course, allows the stator to be moved upwardly generally coaxially with axis A of rotatable assembly 5.

Upon the further conjoint upward movement of stator 3 and clamps 77, 77a in response to the additive compressive force of springs 67, 67a, the stator upper end high portion is assumed to effect initial engagement with stop 75, as previously mentioned, and in response to such engagement, stop 75 is driven or moved upwardly relative to stop 75a. Since stop 75 and sleeve 73 are integral parts of rocker arm 45, the upward relative movement of stop 75 effects pivotal movement of the rocker arm about its pivot point 47 thereby to pivotally move opposite sleeve 73a and stop 75a downwardly toward engagement with the lower portion on the upper end of stator 3. When stop 75a and stator upper end low portion engage each other with stop 75 engaged with the stator upper end high portion, as mentioned above, rocker arm 45 is then in its steady state, i.e., not being able to be further pivotally actuated or moved, and the upward movement of stator 3 toward its assembly position is arrested. In this manner, it may be noted tha the relative generally vertically spaced apart positions of stops 75, 75a with respect to each other at which the upward movement of stator 3 is arrested defines the assembly position of the stator. Further, it may also be noted that the pivotal movement of rocker arms 45, 47 effect upon the engagement of clamps 77, 77a with the high and low portions on the lower end of stator 3 and also the engagement of the high and low portions on the upper end of the stator with tops 75, 75a, respectively, permits the upward movement of the stator bore 37 generally coaxially about the periphery of rotatable assembly 5 along its axis A to the assembly position of the stator without canting or skewing the stator with respect to the rotatable assembly axis thereby to compensate for the out-of-square upper and lower end of the stator.

When stator 3 is in its assembly position, driving gears 79, 79a are actuated by suitable means, such as rotary solenoids or other actuators well known in the art, thereby to drivingly rotate driven gears 83, 83a which are meshed therewith. Worm gears 85, 85a, which are meshed with driven gears 83, 83a, are driven downwardly in response to the rotation of the driven gears thereby to wedge cooperating male and female locking members 87, 89 and 87a, 89a into locking engagement between frame 131 of upper fixture 9 and the periphery of sleeves 73, 73a. In this manner, the locking engagement of male and female locking members 87, 89 and 87a, 89a between upper fixture frame 131 and sleeves 73, 73a positively locks rocker arm 45 against further pivotal movement thereby to maintain stator 3 against displacement from its assembled position.

With rocker arm 45 so locked against further movement, upper slide 13 is now raised to its original at-rest position dissociating its rods 63, 63a from upper fixture 9 and disengaging its push pin 151 from upper fixture bell crank 135; therefore, upon such disengagement, spring 137 effects pivotal movement of the bell crank thereby to drive wedge 55 into engagement with its cooperating surface 138 on wedge block 61 to contain the forces of wedge block springs 57. At substantially the same time, lower slide 15 is initially rotated to disengage its bayonet means 91 from flanges 93, 93a on cylindric member 95 and also retracted downwardly to its original at-rest position.

In this manner, upper and lower slides 13, 15 are retracted to their original positions disassociated from fixture 9, 11 which may then be moved from its loading work station in the automatic motor assembly machine to another work station therein (not shown) for introducing end-play between components of dynamoelectric machine 1 and for connecting stator beams 31 with end frames 7, 35. However, since the operation for introducing end-play between components of dynamoelectric machine 1 could alternatively be accomplished at the loading work station of the automatic motor assembly machine if desired, such end-play introduction operation is set forth hereinafter.

To introduce the end-play, screw 101 is threadedly rotated in nut 103 upwardly relative thereto by the torque limiting device, indicated generally by the rotational arrow R in FIG. 8A, toward engagement with the lower end 99 of shaft 23 or with the lower end of shaft spacer 104 if it is employed. Since the lengths of various shafts 23 of rotatable assembly 5 vary from one another and since tolerance build up permit shafts to extend various lengths or distances from lower end plate 7, it may be noted that it is necessary to sense or locate the true position of shaft end 99 in order to introduce a predetermined or constant amount of end-play into each dynamoelectric machine irrespective of variances in shaft lengths and tolerance build-ups between components thereof. Upon making contact with shaft end 99, the resistive force thereupon encountered by screw 101 causes the torque limiting device R therefor to slip, and in this manner, further threaded upward movement of the screw is obviated once it senses or locates the true position of shaft lower end 99 by engaging it.

With screw 101 in its sensing or locating position engaged with the shaft lower end 99, actuating means (not shown) but indicated by the force arrow F in FIG. 8B, is actuated thereby to conjointly drive screw 101, nut 103, and spacer 105 upwardly relative to guide cylinder 127 disengaging the nut from its seat 157 and engaging the spacer with its movement limiting abutment 109. This upward movement of shaft end sensing assembly 107 conjointly drives rotatable assembly 5 and upper end frame 35 upwardly therewith relative to lower end frame 7 against the compressive forces of trunnion block and wedge block springs 51, 57 toward an end-play position in which the predetermined amount of end-play defined by travel T is introduced between rotatable assembly 5 and lower end frame 7. This conjoint upward movement for introducing end-play is limited by the engagement of spacer 105 with its cooperating abutment 109 on guide cylinder 127, and it may be noted that travel T therebetween defines the predetermined amount of end-play introduced between rotatable assembly 5 and lower end frame 7. Rotatable assembly 5 and upper end frame 35 are maintained in their displaced or end-play positions until stator beams 31 are connected to upper and lower end frame 7, 35, as disclosed in the aforementioned copending application.

From the foregoing, it is now apparent that novel apparatus 17, 153 and methods for aligning components of a dynamoelectric machine and for introducing end-play between components of a dynamoelectric machine are provided meeting all of the objects and advantageous features set forth hereinabove, as well as other objects and advantageous features, and that changes in the particular arrangements, shapes and details of components embraced by such novel apparatus, as well as variances in practicing such novel methods, may be made without departing from the spirit and scope of the invention, as set out in the claims which follow.

What I claim as new and desire to secure by Letters Patent of the United States is:

1. A method of positioning components of a dynamoelectric machine for assembly and compensating for an out-of-square stator comprising the steps of:
   a. supporting a rotatable assembly of the dynamoelectric machine in at least one end frame thereof and having the stator disposed about the rotatable assembly;
   b. displacing a pair of means for clamping the stator into engagement with a high portion and a low portion on an end of the stator; and
   c. moving the stator and the clamping means conjointly generally coaxially with the axis of the rotatable assembly toward a position for assembly without skewing the stator with respect to the axis.

2. The method as set forth in claim 1, comprising the additional step of locking the stator in its assembly position.

3. The method as set forth in claim 1, comprising the preliminary step of locating the rotatable assembly in one of the end frames for predetermining the position of the axis of the rotatable assembly.

4. The method as set forth in claim 1, comprising the intermediate step of biasing the rotatable assembly and the one end plate into engagement subsequent to the supporting step.

5. The method as set forth in claim 1, wherein the supporting step comprises placing the one end frame in a predetermined position on an assembling fixture therefor.

6. The method as set forth in claim 5, wherein the supporting step further comprises locating the rotatable assembly and the one end frame relative to each other.

7. The method as set forth in claim 6, wherein the locating step comprises inserting an end of a shaft of the rotatable assembly through means in the one end frame for bearing engagement with means for locating the shaft in the assembling fixture.

8. The method as set forth in claim 6, wherein the supporting step further comprises disposing about the rotatable assembly means for shim spacing between the rotatable assembly and the stator.

9. The method as set forth in claim 8, wherein the supporting step further comprises positioning a bore of the stator about the rotatable assembly and engaging the shim means.

10. The method as set forth in claim 9, comprising the intermediate step of biasing the rotatable assembly generally along the axis thereof for engaging the rotatable assembly with the one end frame and placing other means of another end frame for bearing engagement with the shaft on an opposite end thereof.

11. The method as set forth in claim 1, wherein the moving step further comprises terminating the conjoint displacement of the clamping means and the stator by engaging a high portion on an opposite end of the stator with one of a pair of means for stopping the stator and urging the one stopping means to a position defining with the other of the stopping means the assembly position of said stator upon the engaging of a low portion on the opposite end with the other stopping means.

12. The method as set forth in claim 1, wherein the moving step comprises driving the clamping means to positions for movement into engagement with the end of said stator.

13. The method as set forth in claim 12, wherein the moving step further comprises urging the clamping means toward engagement with the low portion and the high portion of the stator end, respectively.

14. The method as set forth in claim 13, wherein the moving step further comprises resisting further urging of one of the clamping means with the other thereof upon the engaging of the one clamping means with the stator end high portion.

15. The method as set forth in claim 14, wherein the moving step further comprises permitting the relative urging of the other clamping means for the engaging thereof with the stator end low portion upon the engaging of the one clamping means with the stator end high portion.

16. The method as set forth in claim 15, wherein the resisting and permitting steps comprise pivoting rocker arm means for arresting the urging force of the one clamping means upon the engaging thereof with the stator end high portion and thereby allowing the urging force of the other clamping means to engage it with the stator end low portion.

17. The method as set forth in claim 15, wherein the moving step further comprises effecting further conjoint urging of the clamping means respectively engaging the stator end high and low portion for moving the stator into its assembly position.

18. The method as set forth in claim 17, wherein the effecting step comprises engaging a high portion of an opposite end of the stator with one of a pair of means for stopping the stator and displacing the one stopping means to a position terminating the conjoint urging of the stator by the clamping means and defining with the other of the stopping means the stator assembly position upon the engaging of a low portion on the opposite end of the stator with the other stopping means.

19. The method as set forth in claim 18, wherein the engaging step comprises pivoting the rocker arm means for preventing the displacing of the one stopping means to the stator assembly position and thereby allowing the engaging of the stator opposite end low portion with the other stopping means for arresting the urging force of the clamping means.

20. The method as set forth in claim 1, comprising the additional step of introducing a predetermined amount of end play between the rotatable assembly and the end frames.

21. A method of positioning components of a dynamoelectric machine for assembly and compensating for an out-of-square stator comprising the steps of:
 a. pivoting a rocker arm and permitting relative movement of a pair of means thereof for clamping the stator in an assembly position to respectively engage a low portion and a high portion on an end of the stator;
 b. moving the clamping means and stator conjointly along the axis of a rotatable assembly received in the stator to the assembly position of the stator without skewing it with respect to the axis; and
 c. pivoting another rocker arm and permitting relative movement of a pair of means thereof for stopping the stator in its assembly position in response to the respective engaging of other high and low portions of an opposite end of said stator with the stopping means.

22. A method of positioning components of a dynamoelectric machine for assembly and compensating for an out-of-square stator comprising the steps of:
 a. urging a pair of means for clamping the stator in an assembly position toward the stator to engage one thereof with an end surface of the stator;
 b. pivoting the clamping means about a pivot point located a predetermined distance from a rotatable assembly disposed within the stator and generally on the axis of the rotatable assembly for engaging the other of the clamping means and the stator end surface; and
 c. moving the stator conjointly with the clamping means engaged therewith toward the assembly position for the stator.

23. The method as set forth in claim 22, comprising the intermediate step of resisting further urging of the one clamping means with the other clamping means upon the engaging of the one clamping means with the stator and high portion prior to the pivoting step.

24. The method as set forth in claim 22, wherein means is pivotally interconnected between the clamping means for pivoting generally about the pivot point.

25. The method as set forth in claim 22, comprising the additional step of engaging an opposite end of the stator with at least one of a pair of means for stopping the stator generally at the assembly position thereof.

26. The method as set forth in claim 22, comprising the additional step of engaging an opposite end of the stator with one of a pair of means for stopping the stator and displacing the one stopping means to a position terminating the movement of the stator by the clamping means and defining with the other of the stopping means the stator assembly position upon the engaging of the stator opposite end with the other stopping means.

27. A method of predetermining end-play of a rotatable assembly in a dynamoelectric machine comprising the steps of:
a. supporting an end frame serving generally as a reference for locating an end portion of the rotatable assembly disposed therein;
b. sensing the position of a free end extending from the rotatable assembly end portion; and
c. moving the rotatable assembly a predetermined distance from the sensed position of its free end relative to the end plate for predetermining the amount of end-play between the rotatable assembly end portion and the end frame.

28. The method as set forth in claim 27, wherein the sensing step comprises urging means for sensing the free end of the rotatable assembly into engagement therewith for determining the position thereof.

29. The method as set forth in claim 28, wherein the moving step comprises driving the rotatable assembly and the sensing means engaging the free end thereof conjointly through the predetermined distance.

30. The method as set forth in claim 28, comprising the preliminary step of disposing a pair of means for limiting the end play of the rotatable assembly the predetermined distance apart to respectively engage with at least a part of the sensing means and between which the sensing means is movable.

31. Apparatus for providing a predetermined amount of end-play between components of a dynamoelectric machine comprising means for sensing the position of an end portion of a rotatable assembly mounted in an end frame of the dynamoelectric machine, and means for conjointly actuating the sensing means and the rotatable assembly relative to the end frame from the sensed position to another position defining a predetermined amount of rotatable assembly end-play in the dynamoelectric machine.

32. Apparatus as set forth in claim 31, wherein the sensing means comprises means movable relative to the end portion and into locating engagement therewith for determining its sensed position.

33. Apparatus as set forth in claim 31, wherein said sensing means comprises means adjustably movable relative to said end portion and into locating engagement therewith for determining its sensed position, and means for supporting said adjustably movable means and responsive to actuation of said actuating means for conjointly moving said adjustably movable means and said rotatable assembly from the sensed position to the other position thereof.

34. Apparatus as set forth in claim 33 further comprising a pair of abutments predeterminately spaced apart a distance substantially equal to the predetermined amount of end-play, the supporting means being movable between the abutments in response to actuation of the actuating means.

35. Apparatus for positioning components of a dynamoelectric machine for assembly to compensate for an out-of-square stator comprising means for supporting a rotatable assembly of the dynamoelectric machine in at least one end frame thereof; and a pair of means for respective engagement with a low portion and a high portion on an end of the stator and operable generally for moving the stator relative to the one end frame and the rotatable assembly generally coaxially with the axis thereof toward an assembly position of the stator without skewing it with respective to the rotatable assembly axis.

36. Apparatus as set forth in claim 35, wherein one of the engagement means engages the stator end high portion prior to the engagement of the other of the engagement means with the stator end low portion, and means connected with the engagement means for pivoting therebetween, the pivoting means being operable generally to effect relative motion between the engagement means and resist movement of the stator toward its assembly position until the other engagement means engages the stator end low portion.

37. Apparatus as set forth in claim 35, further comprising a pair of means for stopping the stator in its assembly position and for respective engagement with a low portion and a high portion on an opposite end of the stator.

38. Apparatus as set forth in claim 37, wherein one of the stopping means engages the stator opposite end high portion prior to the engagement of the other of the stopping means with the stator opposite end low portion, and further comprising other means connected with the stopping means for pivoting therebetween, the other pivoting means being operable generally to effect movement of the one stopping means relative to the other stopping means until it engages with the stator opposite end low portion in the assembly position of the stator.

39. Apparatus as set forth in claim 35, further comprising means for introducing a predetermined amount of end-play between the rotatable assembly and the one end plate.

40. Apparatus as set forth in claim 35, further comprising means for biasing the rotatable assembly substantially along the axis thereof toward engagement with the one end plate.

41. Apparatus as set forth in claim 35, wherein another end frame is received on the rotatable assembly opposite to the one end frame, and further comprising means for urging the other end frame toward engagement with the rotatable assembly.

42. Apparatus as set forth in claim 41, further comprising means for selectively interrupting the force of the urging means.

43. Apparatus as set forth in claim 35, further comprising means including the engagement means for locking the stator in its assembly position.

44. Apparatus as set forth in claim 35, further comprising means for locating the one end frame on the apparatus.

45. Apparatus as set forth in claim 35, further comprising means for locating the rotatable assembly to predetermine the position of the axis thereof.

46. Apparatus as set forth in claim 35, further comprising means for urging the rotatable assembly into engagement with the one end frame.

47. Apparatus as set forth in claim 35, further comprising means for disposing a plurality of shims about the rotatable assembly for spacing the stator therefrom.

48. Apparatus as set forth in claim 35, further comprising means for engagement with the opposite end of the stator for stopping it in its assembly position.

49. Apparatus as set forth in claim 35, further comprising means for resisting movement of the stator toward its assembly position when one of the engagement means is engaged with the high portion on the stator end until the other of the engagement means engages the low portion on the stator end.

50. Apparatus as set forth in claim 37, further comprising means for effecting movement of one of the stopping means relative to the other thereof engaged with the high portion on the stator opposite end until the one stopping means engages the low portion of the stator opposite end.

51. A method of positioning components of a dynamoelectric machine and compensating for an out-of-square stator comprising the steps of:
a. supporting a rotatable assembly of the dynamoelectric machine in at least one end frame thereof and having the stator disposed about the rotatable assembly;
b. urging a pair of means for clamping the stator in an assembly position respectively toward engagement with a low portion and a high portion of an end of the stator and resisting further urging of one of the clamping means with the other thereof upon the engaging of the one clamping means with the high portion on the end of the stator; and
c. moving the clamping means and the stator generally along the axis of the rotatable assembly toward the assembly position of the stator without skewing it with respect to the axis.

52. The method as set forth in claim 51, whrein the urging and resisting step further comprises permitting the relative urging of the other clamping means for the engaging thereof with the stator end low portion upon the engaging of the one clamping means with the stator end high portion.

53. The method as set forth in claim 52, wherein the urging and resisting step and the permitting step comprise pivoting a rocker arm for arresting the urging force of the one clamping means upon the engaging thereof with the stator end high portion and thereby allowing the urging force of the other clamping means to engage it with the stator end low portion.

54. The method as set forth in claim 52, wherein the moving step further comprises effecting conjoint urging of the clamping means to displace the stator generally coaxially of the rotatable assembly toward the assembly position of the stator without skewing it with respect to the axis of the rotatable assembly.

55. The method as set forth in claim 51, comprising the additional step of engaging a high portion of an opposite end of the stator with one of a pair of means for stopping the stator and displacing the one stopping means to a position terminating the urging of the stator by the clamping means thereby to define with the other of the stopping means the stator assembly position upon the engaging of a low portion on the stator opposite end with the other stopping means.

56. The method as set forth in claim 55, wherein the engaging and displacing step comprises pivoting a rocker arm for permitting the displacing of the one stopping means to the stator assembly position and thereby allowing the engaging of the stator opposite end low portion with the other stopping means for arresting the urging force of the clamping means.

57. A method of predetermining end-play of a rotatable assembly in a dynamoelectric machine comprising the steps of:
a. mounting the rotatable assembly with another component of the dynamoelectric machine generally in a located position;
b. sensing the position of at least a portion of the rotatable assembly in the located position thereof; and
c. displacing the rotatable assembly from the sensed position relative to the located position a predetermined distance generally constituting the end-play.

58. The method as set forth in claim 57, wherein the sensing step comprises driving means for sensing the position of the rotatable assembly portion into sensing engagement therewith.

59. The method as set forth in claim 58, wherein the displacing step comprises moving conjointly the sensing means and the rotatable assembly respectively from the respective sensing position and located position thereof through the predetermined distance.

60. The method as set forth in claim 58, comprising the preliminary step of spacing at least a portion of the sensing means from means for motion limiting engagement therewith a distance generally constituting the predetermined amount of end-play of the rotatable assembly.

61. The method as set forth in claim 58, wherein the sensing step further comprises interrupting the driving of the sensing means generally upon the sensing engagement thereof with the rotatable assembly portion.

62. The method as set forth in claim 58, comprising the preliminary step of connecting the sensing means with means for driving it through the predetermined distance.

63. The method as set forth in claim 58, wherein the sensing means includes at least a torque screw for protractive and retractive movement to engage the rotatable assembly portion.

64. The method as set forth in claim 57, comprising the intermediate step of urging the rotatable assembly toward its located position prior to the sensing step.

65. The method as set forth in claim 57, comprising the intermediate step of containing means for urging the rotatable assembly toward its located position prior to the displacing step.

66. Apparatus for providing a predetermined amount of end play between components of a dynamoelectric machine comprising means for locating an end frame of a dynamoelectric machine, means for sensing the position of at least a portion of a rotatable assembly for the dynamoelectric machine mounted in the end frame, and means for driving both the sensing means and the rotatable assembly relative to the end frame through a predetermined distance generally constituting the predetermined amount of end play of the rotatable assembly in the dynamoelectric machine.

67. Apparatus as set forth in claim 66, further comprising means for motion limiting engagement with at least a portion of the sensing means and spaced from the sensing means a distance generally constituting the predetermined distance.

68. Apparatus as set forth in claim 66, further comprising means for moving the sensing means into sensing engagement with the portion of the rotatable assembly.

69. Apparatus as set forth in claim 68, further comprising means for interrupting the moving of the sensing means generally upon the sensing engagement thereof with the portion of the rotatable assembly.

70. Apparatus as set forth in claim 66, further comprising means for urging at least another portion of the rotatable assembly into locating engagement with the end frame so that the position of the first named portion of the rotatable assembly may be sensed.

71. Apparatus as set forth in claim 70, further comprising means for containing the urging means to permit the driving of the sensing means and the rotatable assembly through the predetermined distance.

72. Apparatus as set forth in claim 66, wherein the sensing means includes at least a torque screw protractively and retractively movable for the sensing engagement thereof with the portion of the rotatable assembly.

73. Apparatus as set forth in claim 72, wherein the sensing means further includes means for carrying the torque screw, the carrying means being connected with the actuating means.

74. Apparatus as set forth in claim 73, further comprising a housing in which the sensing means is movable, means on the housing for seating the carrying means, and means on the housing for engagement with at least a portion of the carrying means and spaced therefrom the predetermined distance when the carrying means is seated on the seating means.

75. Apparatus as set forth in claim 66, wherein the sensing means includes means movable relative to the position of the rotatable assembly and into locating engagement therewith for determining its sensed position.

76. Apparatus for positioning components of a dynamoelectric machine for assembly to compensate for an out-of-square stator comprising means for supporting a rotatable assembly mounted at least in part between a pair of opposite end frames, means for urging the end frames and rotatable assembly toward engagement with each other, means for moving the stator relative to the end frames and the rotatable assembly generally coaxially with the axis thereof toward an assembly position of the stator without skewing it with respect to the rotatable assembly axis, and means for selectively interrupting the force of the urging means.

* * * * *

UNITED STATES PATENT OFFICE
CERTIFICATE OF CORRECTION

PATENT NO. : 3,857,170
DATED : December 31, 1974
INVENTOR(S) : Jesse A. Stoner

It is certified that error appears in the above-identified patent and that said Letters Patent are hereby corrected as shown below:

```
Column  3, line  4, change "in" to --is--
Column  4, line 64, delete ","
Column  7, line 61, change "or" (second occurrence) to --of--
Column  8, line 13, change "is" to --in--
Column  8, line 33, change "scraper" to --spacer--
Column  9, line 15, change "suitable" to --suitably--
Column 12, line 32, change "force" to --forces--
Column 13, line  4, change "effect" to --effected--
Column 13, line  8, change "tops" to --stops--
Column 13, line 14, change "end" to --ends--
Column 18, line  4, after "33" insert --,--
Column 18, line 20, change "respective" to --respect--
Column 22, line 16, change "position" to --portion--
```

Signed and sealed this 24th day of June 1975.

(SEAL)
Attest:

RUTH C. MASON
Attesting Officer

C. MARSHALL DANN
Commissioner of Patents
and Trademarks